W. J. La GRANGE.
THRASHING-MACHINE.

No. 176,793 Patented May 2, 1876.

Witnesses:
Jas. J. Duhamel
Thomas Byrne

Inventor:
W. J. LaGrange
Per H. Abbot
Attorney

UNITED STATES PATENT OFFICE.

WILLIAM J. LA GRANGE, OF STUYVESANT FALLS, NEW YORK.

IMPROVEMENT IN THRASHING-MACHINES.

Specification forming part of Letters Patent No. 176,793, dated May 2, 1876; application fi'ed March 22, 1875.

*To all whom it may concern:*

Be it known that I, WILLIAM J. LA GRANGE, of Stuyvesant Falls, county of Columbia and State of New York, have invented certain new and useful Improvements in Thrashing-Machines, of which the following is a specification:

My invention relates to certain improvements in the combination and arrangement of the "concave" of a thrashing-machine, as will be hereinafter more fully set forth.

In order to enable others skilled in the art to which my invention appertains to make and use the same, I will now proceed to describe its construction and operation, referring to the annexed drawing, which forms a part of this specification, and in which—

Figure 1:
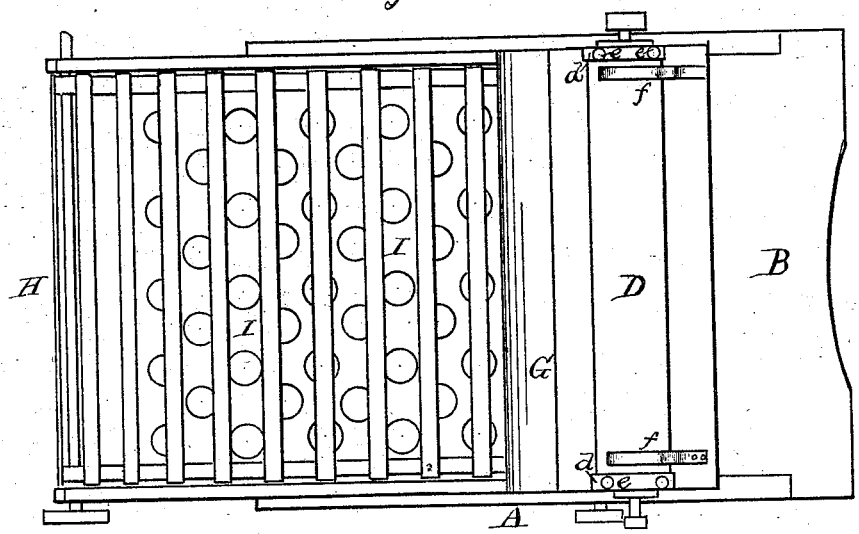
Figure 1:
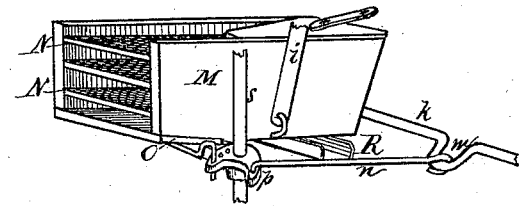
Figure 2:
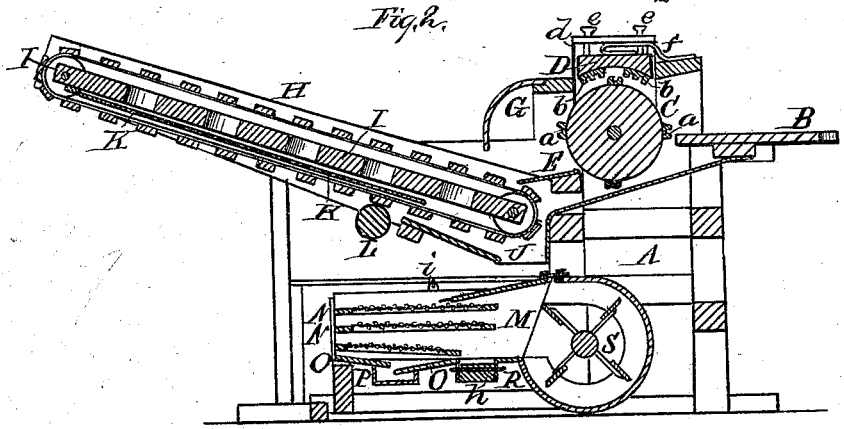
Figure 2:

Figure 1 is a plan view of my machine. Fig. 2 is a longitudinal vertical section of the same through the center.

A represents the frame of my machine, at one end of which is the feed-table B, over which the grain is fed to the machine. C is the thrashing-cylinder, provided on its outer side with a series of longitudinal ribs, $a$ $a$, fastened thereon, and extending from end to end of the cylinder. Each rib $a$ is grooved longitudinally, forming, as it were, two parallel bars on a single base. Above the cylinder C is a concave, D, provided on its under side with two plates, $b$, which are grooved or corrugated longitudinally, and extending from near the center to each side, as shown. This concave rests in metal frames $d$ attached to the main frame, and it is held down by means of springs $f$, allowing the concave to yield to the pressure of the grain passing between the cylinder and concave. Through the top of each frame $d$ passes set screws $e$ $e$ to regulate the distance the concave shall rise. In front of the cylinder C and concave D is a board, E, for the grain and straw to fall upon in passing to the separator, the straw being directed by the concave director G. The straw is then carried out by the elevator H, which passes over a perforated board, I, to allow the grain carried up by the straw to fall down. The grain from the cylinder and elevator falls down into the hopper J of the mill underneath.

Having thus fully described my invention, what I claim as new, and desire to secure by Letters Patent, is—

The flanged frames $d$, provided with set-screws $e$, in combination with the concave D and springs $f$, substantially as and for the purpose set forth.

In testimony that I claim the foregoing as my invention I hereunto affix my signature this 11th day of March, 1875.

WM. J. LA GRANGE.

Witnesses:
 J. H. LA GRANGE,
 RUSSEL D. WILBUR.